United States Patent [19]

Hsu

[11] 4,205,476
[45] Jun. 3, 1980

[54] VIDEO-SMELLING BAIT FOR FISHING

[76] Inventor: Yun T. Hsu, 30-27, Chun In Rd., Chun In Village, Tong Sun Hsiang, I Lan Hsien, Taiwan

[21] Appl. No.: 931,949

[22] Filed: Aug. 8, 1978

[51] Int. Cl.² ............................................. A01K 85/00
[52] U.S. Cl. ................................... 43/42.06; 43/42.35
[58] Field of Search ................... 43/42.06, 42.35, 41

[56] References Cited

U.S. PATENT DOCUMENTS

| | | | |
|---|---|---|---|
| 2,749,647 | 6/1956 | Beloff | 43/42.06 |
| 2,937,467 | 5/1960 | Capps | 43/42.06 |
| 3,654,724 | 4/1972 | Charron | 43/42.06 |
| 3,835,572 | 9/1974 | Mounsey | 43/42.06 |

Primary Examiner—Nicholas P. Godici
Assistant Examiner—Roscoe V. Parker
Attorney, Agent, or Firm—Cushman, Darby & Cushman

[57] ABSTRACT

The present invention provides fishing with a novel design of bait in the shape similar to small fish, shrimp, cuttle or other insects, wherein the foodstuff for inducing fish can be set and whereon there are a number of orifices, through which the said foodstuff can smell outward so as to induce the fish to bite.

1 Claim, 3 Drawing Figures

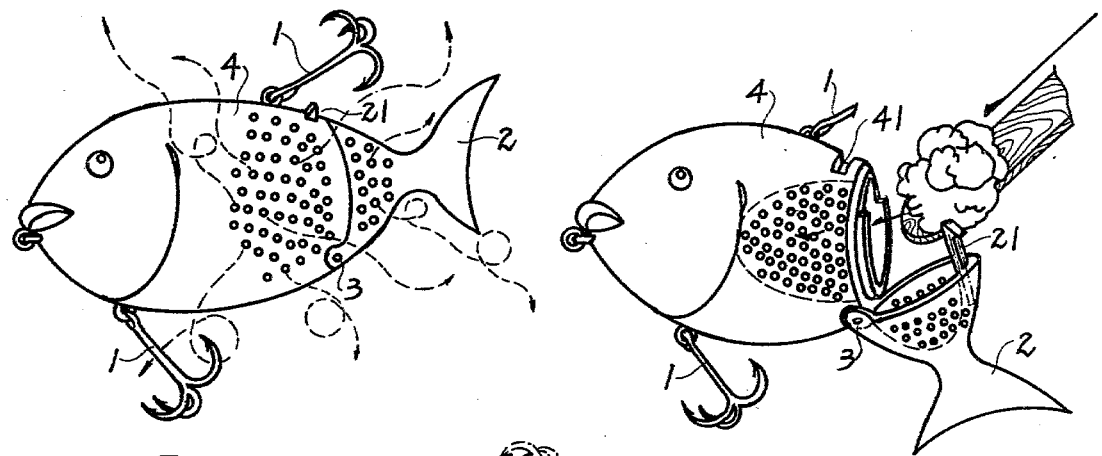
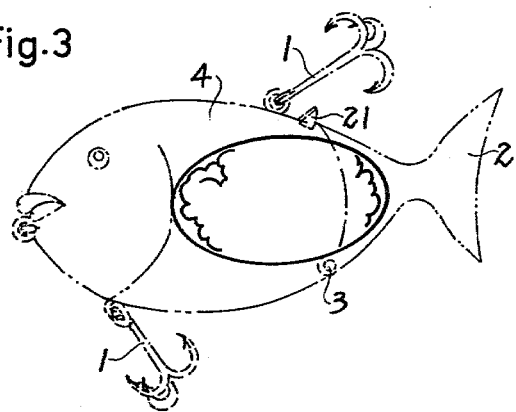
Fig. 3
Fig. 1
Fig. 2

4,205,476

VIDEO-SMELLING BAIT FOR FISHING

BACKGROUND OF THE INVENTION

In connection with fishing, the bait is always required for inducing the fish to bite. The best ideal design of bait consists in, of course, stimulating the sight and taste of fish. However, the conventional bait for fishing emphasizes its taste so that some foodstuff or diced meat is set on the fishing hook aimed at inducing the fish to bite.

As a rule, the larger fish is used to swallow the smaller one. Therefore, the bait in the shape similar to small fish, shrimp, cuttle or other insects certainly will further promote the chance for inducing the fish to bite so far as the sight of fish is concerned in addition to the taste thereof. Based on this principle, the present novel design of desirable video-smelling bait for fishing is created to fully develop the maximum function of bait and to increase the biting rate of fish. In summary, this novel bait is characterized by that the foodstuff set in the bait smells in the water through the said orifices after the bait is launched into the water and that in keeping with its outer shape, its dual effect of being sighted and smelt by the fish is fully developed when it induces the fish to bite.

BRIEF DESCRIPTION OF THE DRAWINGS

FIG. 1 shows a side view of an open fish-shaped video-smelling bait for fishing under the present creation so that the said foodstuff for inducing fish can be easily put in the interior of bait.

FIG. 2 shows a side view of a shut fish-shaped video-smelling bait for fishing under the present creation wherein the said foodstuff set in a oval space in the bait for inducing fish is indicated.

FIG. 3 shows a side view of a shut fish-shaped video-smelling bait for fishing under the present creation wherein the arrowheads indicate the directions of the said foodstuff set in the bait smells outward through the orifices.

(1) Fishing hook
(2) Tail section of bait
(3) Connecting fulcrum
(4) Body section of bait
(21) Hasping hook
(41) Hasping hole

DESCRIPTION OF THE PREFERRED EMBODIMENT

The structure of the present invention is narrated below in accordance with the embodiment as shown in the drawings set forth hereinbefore: As shown in FIGS. 1 and 2, the outer shape of bait for fishing under the present invention is similar to a small fish, whereon some fishing hooks (1) are set, and wherein it is empty and divided into two sections, the tail section (2) is connected with the body section (4) by using a fulcrum (3) so as to enable it to open or shut. The body section (4) can be made of such hard materials as china, metal or hard plastic but the tail section (2) is to be made of soft plastic in the interest of its release action while opening and shutting. A hasping hook (21) is set on the tail section (2) and a hasping hole (41) is set on the body section (4). When the tail section (2) is shut, the hasping hook (21) hooks the hasping hole (41), so both the body section (4) and the tail section (2) are firmly assembled. If the upper portion of the tail section (2) is pressed down, the hasping hook (21) disengages from the hasping hole (41), it will be open. The foodstuff for inducing the fish to bite is set in the said bait for fishing and many a few orifices are set on this bait so that the foodstuff set in the bait smells in the water after the bait is launched into the water.

SUMMARY OF THE INVENTION

The video-smelling bait for fishing under the present invention can stimulate the taste of fish and attract the sight thereof because of the attractive design of its outer shape so that the best effect of said bait for fishing can be easily achieved, since this novel bait is characterized by that the foodstuff set in the bait smells in the water through the said orifices after the bait is launched into the water and that in keeping with the outer shape, its dual effect of being sighted and smelt by the fish is fully developed when it induces the fish to bite.

I claim:

1. A fishing lure comprising an animal shaped hollow body defining a bait receiving chamber having a longitudinal axis and having a rigid forward head and body end portion and a flexible rear end portion, each of said forward and rear portions having a peripheral surface and a plurality of escape apertures formed in at least one of said front and rear portion peripheral surfaces so that said chamber is in fluid communication with the exterior of said line;

said front portion having a rear edge, said rear portion having a front edge, said front and rear edges each surrounding said longitudinal axis and having indentical dimensions; and means, disposed at said front and rear edges, for pivotally joining said front and rear portions for movement between a first position in which said front and rear edges are mated in abutting relation and a second position in which said front and rear edges are apart except at said pivoting means, and latching means for disengageably holding said front and rear edges in said first position, said latching means including a hasping hole formed in said front portion adjacent said rear edge and extending from said peripheral surface to said chamber and a hasping hook fixed to said rear portion at said front edge for engaging said hasping hole by extending inside said rear edge, into said chamber and through said hole to the exterior of said front end portion, said hasping hook being removable from said hasping hole by squeezing said flexible rear portion so that said hook is drawn toward said longitudinal axis and out of said hole to disengage said front and rear end portions.

* * * * *